United States Patent [19]

Suzuki

[11] Patent Number: 5,574,705
[45] Date of Patent: Nov. 12, 1996

[54] VIBRATION RESISTANT DISC SELECTABLE PLAYER

[75] Inventor: Shoji Suzuki, Iwaki, Japan

[73] Assignee: Alpine Electronics, Inc., Tokyo, Japan

[21] Appl. No.: 406,757

[22] Filed: Mar. 16, 1995

Related U.S. Application Data

[63] Continuation of Ser. No. 111,382, Aug. 24, 1993, abandoned.

[30] Foreign Application Priority Data

Aug. 28, 1992 [JP] Japan .................................. 4-253689
Sep. 4, 1992 [JP] Japan .................................. 4-262845

[51] Int. Cl.$^6$ .................................................. G11B 17/22
[52] U.S. Cl. ............................................................ 369/36
[58] Field of Search .................................. 369/36, 35, 34,
369/37, 38, 191, 192, 77.1–77.2, 75.1–75.2,
491, 492, 178; 360/99.02, 99.06

[56] References Cited

U.S. PATENT DOCUMENTS

| | | | |
|---|---|---|---|
| 4,949,324 | 8/1990 | Arata | 369/38 |
| 5,012,462 | 4/1991 | Tsujita | 369/36 |
| 5,058,090 | 10/1991 | Ueno et al. | 369/36 |
| 5,103,437 | 4/1992 | Kawakami | 369/36 |
| 5,128,918 | 7/1992 | Suzuki et al. | 369/77.1 |
| 5,247,500 | 9/1993 | Miyoshi et al. | 369/36 |

FOREIGN PATENT DOCUMENTS

| | | | |
|---|---|---|---|
| 1154359 | 6/1989 | Japan | 369/191 |
| 1151059 | 6/1989 | Japan | 369/191 |

*Primary Examiner*—Stuart S. Levy
*Assistant Examiner*—Allen Cao
*Attorney, Agent, or Firm*—Guy W. Shoup; Patrick T. Bever

[57] ABSTRACT

A player for selecting and playing a disc (such as a CD) capable of accurately locating its moveable portion for selecting and playing the disc and accurately clamping a selected disc. The moveable portion for selecting and playing the disc is provided with a first and a second moveable chassis. When drive levers are driven by the force of a motor, the second moveable chassis is moved upwards/downwards by a link mechanism. The first and second moveable chassis are mutually locked by locating/locking plates to be moved upwards/downwards. When the first and the second moveable chassis have been moved to the position for selecting the discs from a magazine, the locating/locking plates are moved to be engaged to locating portions formed into plural stages of locking mechanism portions provided for the case of the player so that the first moveable chassis is properly located. As a result, the relative position between the moveable portion and the disc in the magazine is determined accurately.

33 Claims, 10 Drawing Sheets

VIBRATION RESISTANT DISC SELECTABLE PLAYER

This application is a continuation of application Ser. No. 08/111,382, filed Aug. 24, 1993, now abandoned.

BACKGROUND OF THE INVENTION

1. Field of the Invention

The present invention relates to a disc-selectable player for driving a predetermined disc selected from a plurality of discs, and more particularly to a disc-selectable player in which a disc can assuredly be selected, but having a simple structure, and which comprises a disc drive portion for driving a selected disc that cannot be loosened by external force.

2. Related Art Description

A disc changer of a type mounted on a vehicle has been put to practical use as a disc-selectable player for playing a predetermined disc selected from a plurality of discs.

After a magazine accommodating a plurality of discs has been loaded into the conventional disc changer to be mounted on a vehicle, a predetermined disc is ejected from the magazine so that the playing operation is performed. The structure for ejecting the disc from the magazine and for playing it is so arranged that a moveable chassis, on which a disc ejection mechanism is mounted, is moved to a selection position at which any one of a plurality of the discs is selected. At this position, the disc is introduced into the moveable chassis, and then the disc is conveyed to a disc drive portion by the moveable chassis, the disc is clamped by a turn table at the conveyed position so that the disc is rotated, and a pickup performs the disc playing operation.

However, the structure of the foregoing disc changer so arranged that the disc is conveyed to the disc drive portion by the moveable chassis to be played, and the disc, which has been played, is returned to a vacant space in the magazine by the moveable chassis, takes a too long a time from the instant the disc is ejected to the instant the played is commenced. Further, it also takes too long a time to return the played disc into the magazine to commence the next play. Therefore, if the disc is a CD (Compact Disc), the next play of music is interrupted for an excessively long time.

Accordingly, a disc changer of a type comprising a moveable disc drive portion shown in FIG. 13 has been considered. The disc changer of this type comprises a moveable portion 1 on which all of elements of the disc drive portion, such as a turn table 2, a motor 3 for driving the turn table 2, a disc clamper 4 and a pickup 5, are mounted. When the overall body of the moveable portion 1 is moved upwards/downwards to the position at which the disc in the magazine M is selected, a disc D is, at the foregoing position, ejected from the magazine M. Further, the playing operation is performed in the moveable portion 1 positioned at the foregoing position.

The foregoing system reduces the time taken to eject and change the disc.

However, the disc changer structured as shown in FIG. 13 has the following problems.

(a) When the upward/downward operation of the moveable portion 1 is stopped, the height which the moveable portion 1 reaches tends to deviate from its nominal position. Therefore, the position at which the moveable portion 1 faces the disc D to be selected can deviate if the intervals between the stacked discs D in the magazine are too short. As a result, the disc cannot assuredly be ejected. It might be considered feasible to employ a reproduction structure in which the disc D is clamped in the moveable portion 1 in a state where the disc D is pulled out intermediately from the magazine M. If the position at which the moveable portion 1 stops deviates in this case, a portion of the disc D clamped in the moveable portion 1 comes in contact with a partition plate or a tray in the magazine M. As a result, the disc D cannot assuredly be rotated.

(b) A force transmission mechanism for transmitting the force of the motor to move the moveable portion 1 upwards/downwards always involves looseness such as a backlash. Therefore, if the foregoing disc changer is mounted on vehicle, the moveable portion 1, which is performing the playing operation, is loosened due to vibrations of the car body and the like. As a result, the disc tracking servo and focusing servo are affected adversely. What is worse, the disc track which is being played can easily be jumped.

(c) Since the foregoing disc changer must have a disc ejection mechanism for ejecting a predetermined disc D from the magazine M and a clamping mechanism comprising a cam for moving the clamper 4 to clamp the disc D to the turn table 2, the internal structure of the moveable portion 1 becomes too complicated. In particular, the needed space for the motor serving as a drive source for driving the disc ejection mechanism and mounted on the moveable portion 1 causes the overall size of the moveable portion 1 to be excessively large.

(d) During a period in which a predetermined disc D ejected from the magazine M into the moveable portion 1 is being played, another disc D left in the magazine M is sometimes undesirably ejected toward the moveable portion 1 due to external vibrations such as vibrations of the car body. In order to prevent this, a restriction member for preventing the undesirable ejection of the left disc D must be disposed in front of the magazine M. However, the restriction member must be removed from the movement passage for the disc D not to block the movement passage when a desired disc D is selected and ejected. Further, the restriction member must be moved to the position to block the position in front of the magazine M. Therefore, a mechanism for operating the restriction member must also be provided, complicating the apparatus.

SUMMARY OF THE INVENTION

The present invention is intended to overcome the foregoing problems. Therefore, an object of the present invention is to enable a disc selectable player of a type comprising a moveable portion, in which a desired and ejected disc is driven, to accurately bring the moveable portion to a disc selection position, to prevent looseness of the moveable portion at the foregoing position, to simplify the structure of the moveable portion, and to assure clamping of the disc.

In order to achieve the foregoing object, according to one aspect of the present invention a disc selectable player includes a moveable portion having a disc ejection mechanism disposed adjacent to a disc installation portion, which is formed in a case and in which a plurality of discs are installed, and arranged to eject any one of the discs from the disc installation portion and a disc support portion for supporting the ejected disc, and a drive mechanism for moving the moveable portion to any one of the disc ejection positions. The disc selectable player includes: a plural-step locating portion provided for the case and corresponding to the disc ejection positions; and a locating member provided for the moveable portion and arranged to engage with any one of the plural-step locating portion by means of projections and recesses when the moveable portion has been moved to the disc ejection position.

According to another aspect of the present invention, a disc selectable player includes: a first moveable chassis disposed adjacent to an installation portion for a plurality of disks in a case and on which a disc ejection mechanism for ejecting any one of the discs is mounted; a second moveable chassis facing and spaced apart from the first moveable chassis at an interval, which enables the ejected disc to be held; a disc drive portion provided for either of the first or second moveable chassis; a clamper provided for the other chassis; a pickup provided for either moveable chassis; a locating mechanism for locating the first moveable chassis when the first moveable chassis has been moved to an ejection position at which a predetermined disc is ejected; and a drive mechanism for moving the first and second moveable chassis to the ejection position in a state where the interval is maintained and for further moving the second moveable chassis in a direction toward the first moveable chassis after the first moveable chassis has been located, to clamp the disc between the two moveable chassis.

According to the foregoing first aspect of the present invention, the locating member is provided for the moveable portion in which the disc ejection mechanism for ejecting the disc is provided. When the moveable portion is moved to the disc ejection portions for any one of the discs, the locating member of the moveable portion is, by projections and recesses, engaged to any one of the locating portions formed into plural stages and provided in the case so that the position of the moveable portion is determined. Since the moveable portion is stopped to align to the locating portion of the case, any one of a plurality of the discs and the moveable portion can accurately be located. Further, looseness of the moveable portion due to external vibrations is prevented.

According to the foregoing second aspect of the present invention, the first and the second moveable chassis are moved while maintaining a predetermined interval, the first moveable chassis is moved to an ejection position at which a predetermined disc selected from a plurality of the discs is ejected, the first moveable chassis is located at this position, and the disc ejection mechanism (provided for the first moveable chassis, in the foregoing located state) ejects the disc. Then, the second moveable chassis is moved to hold the disc between the two moveable chassis to clamp the disc, and then the disc playing operation is performed by the pickup provided on the moveable chassis. Since for the foregoing aspect has the first moveable chassis is fixedly located, the accuracy in locating the first moveable chassis relative to facing a predetermined disc is improved. Therefore, a predetermined disc can assuredly be ejected. Furthermore, the clamping mechanism can be significantly simplified because the clamping force is transmitted by the moving force of the moveable chassis in such a manner that the second moveable chassis is further moved after the first moveable chassis has been located, so that the disc is clamped between the two moveable chassis.

DETAILED DESCRIPTION OF THE INVENTION

An embodiment of the present invention is now described with reference to the drawings.

Figure 1:
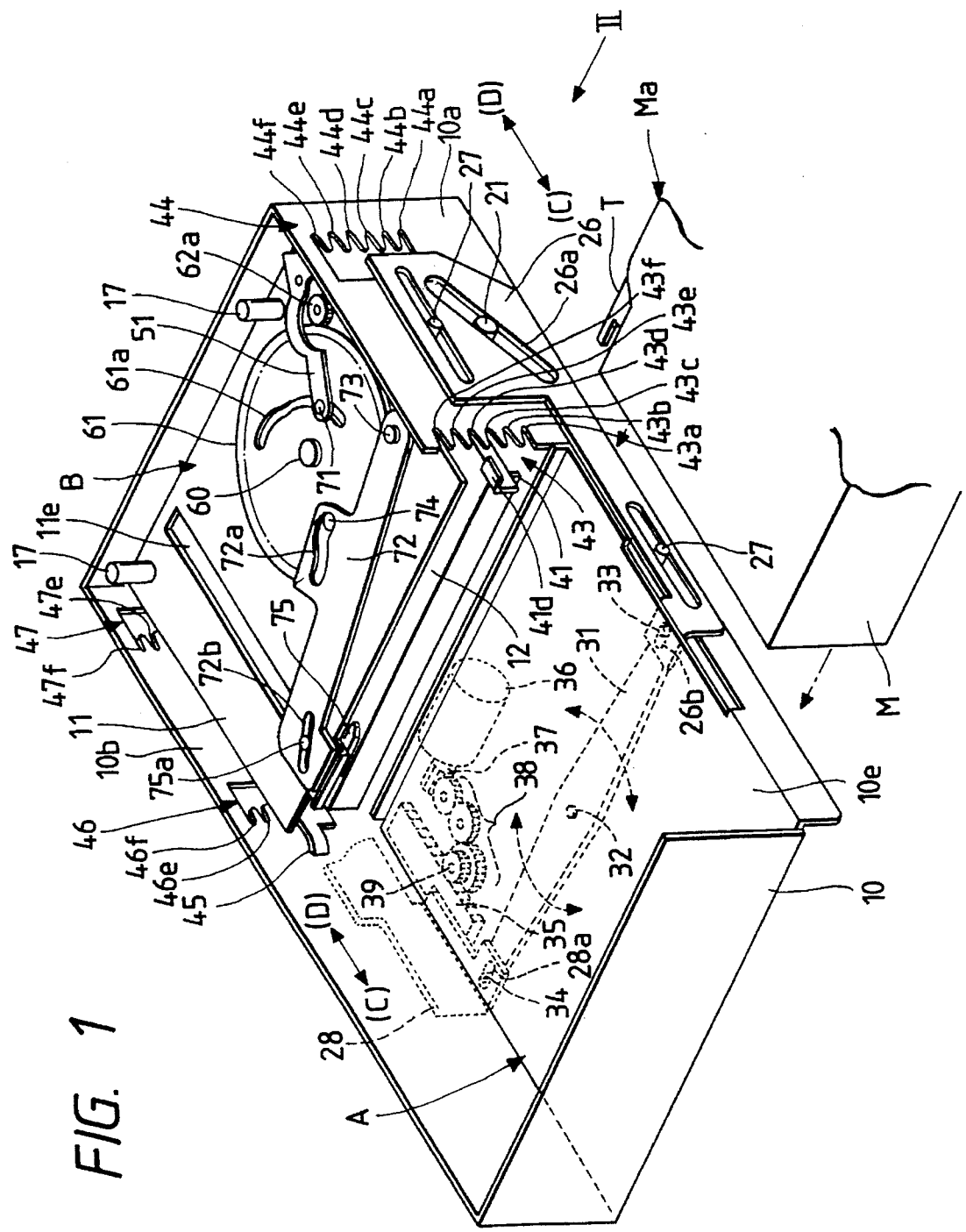
FIG. 1 is an overall perspective view of an example of a disc selectable player according to the present invention.

FIG. 1 is a perspective view which illustrates the structure of a disc selectable player according to the present invention.

Referring to FIG. 1, case 10 has a box-like shape including a disc installation portion A and a disc selection/reproduction portion B. A magazine M is loaded on the disc installation portion A in a direction designated by an arrow shown in FIG. 1. As described with reference to FIGS. 10 to 12, the magazine M is a tray-system magazine having an arrangement that an ejection port Ma is formed in the diagonally right portion of the structure shown in FIG. 1.

Figure 9:
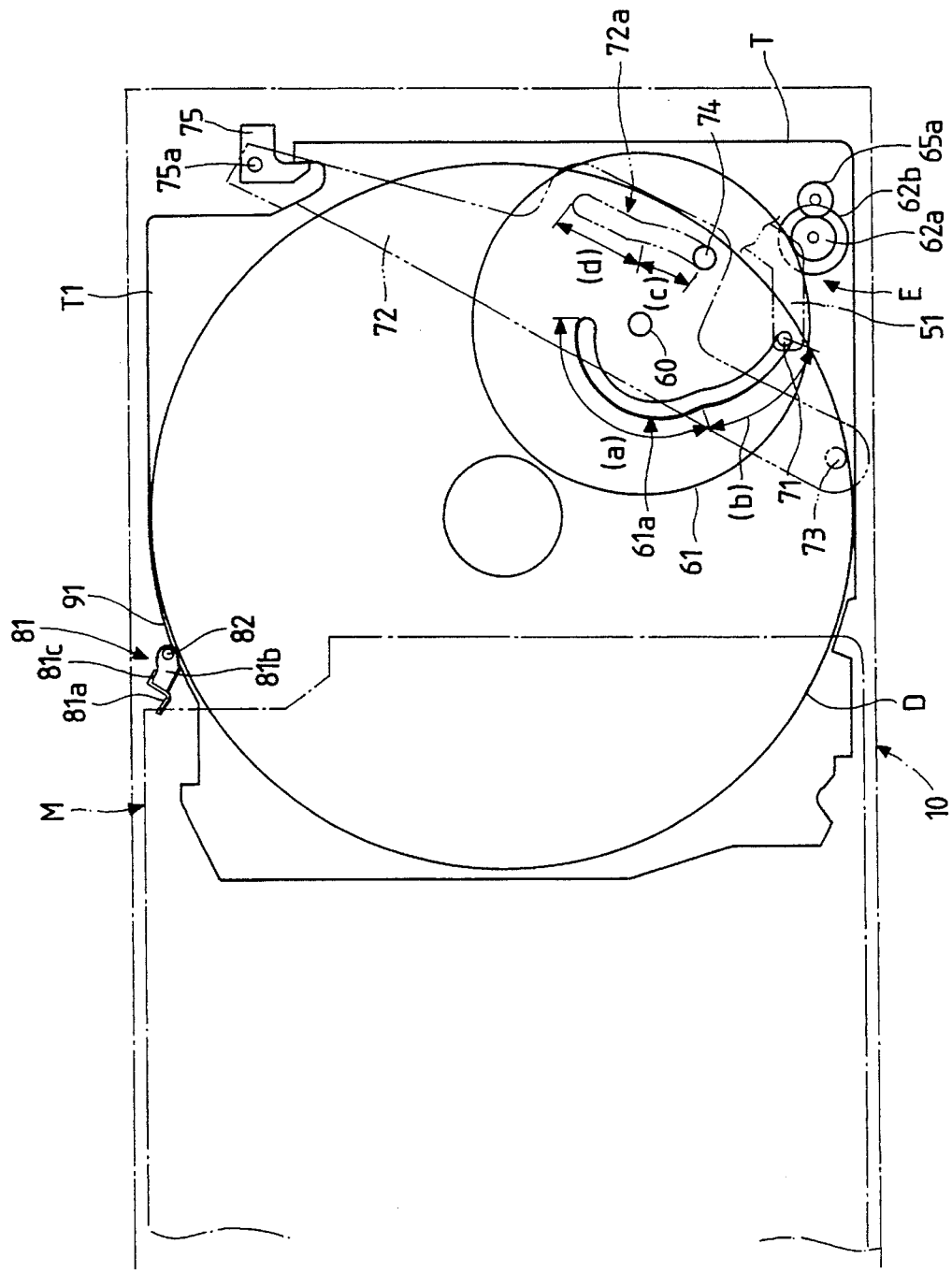
FIG. 9 is a plan view of a state where the tray has been ejected.

As shown in FIG. 9, the disc selectable player according to this embodiment has an arrangement that a tray T1 selected from a plurality of trays T accommodated in the magazine M loaded into the disc installation portion A is ejected to its intermediate position. A disc D clamped in the disc selection/reproduction portion B is rotated in a state where a portion of the disc D is left in the magazine M.

The disc selection/reproduction portion B comprises a first movable chassis 11 and a second movable chassis 12 disposed below the first movable chassis 11. The two movable chassis 11 and 12 constitute a movable portion for selecting and reproducing the disc. Two guide shafts 17 extending from the bottom portion of the case 10 are secured at the right end positions of the structure shown in FIG. 1. The first and second movable chassis 11 and 12 are guided by the guide shafts 17 so that the first and the second movable chassis 11 and 12 are able to move upwards/downwards.

Figure 3:
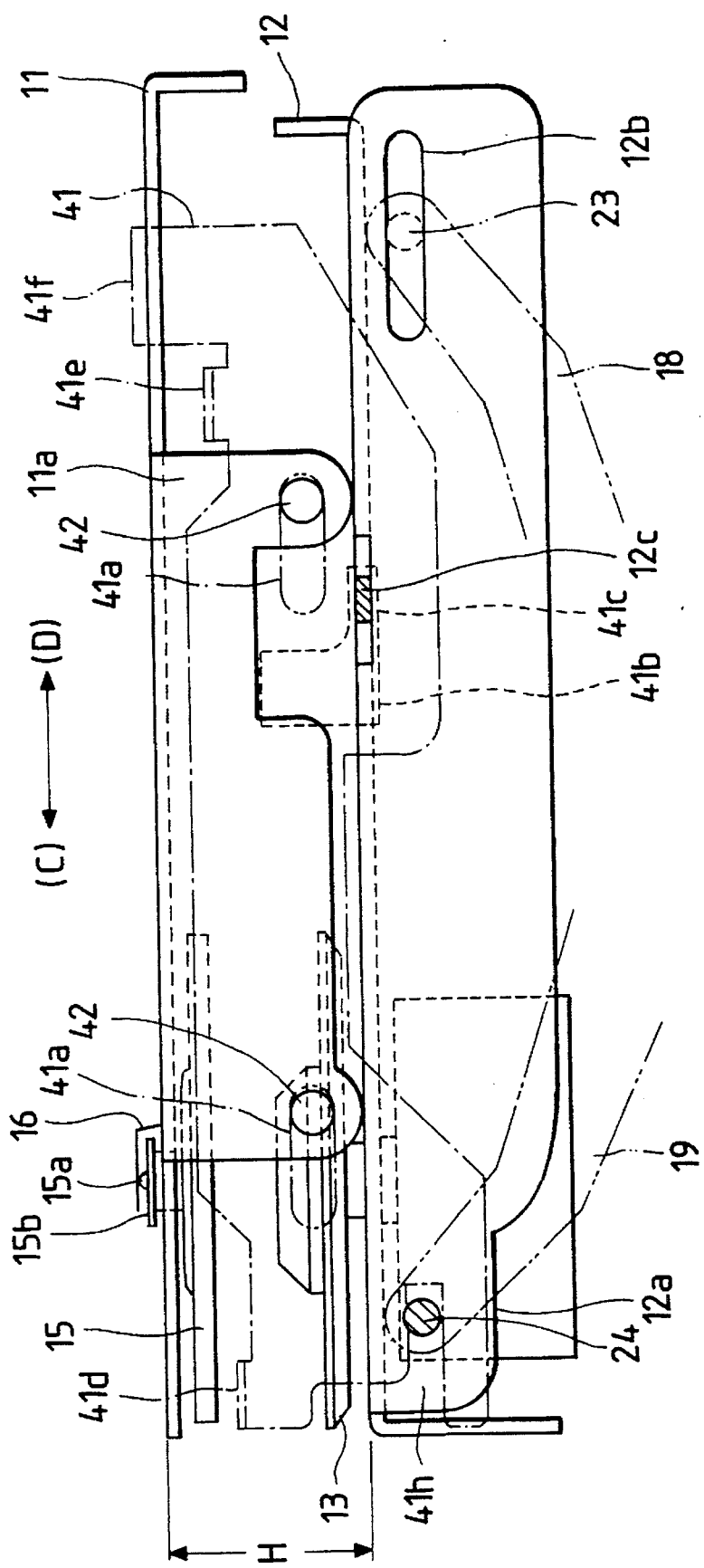
FIG. 3 is a projective front elevational view when viewed from the same direction of FIG. 2 of a mechanism for locking the two moveable chassis and a mechanism for locating a first moveable chassis.
Figure 4:
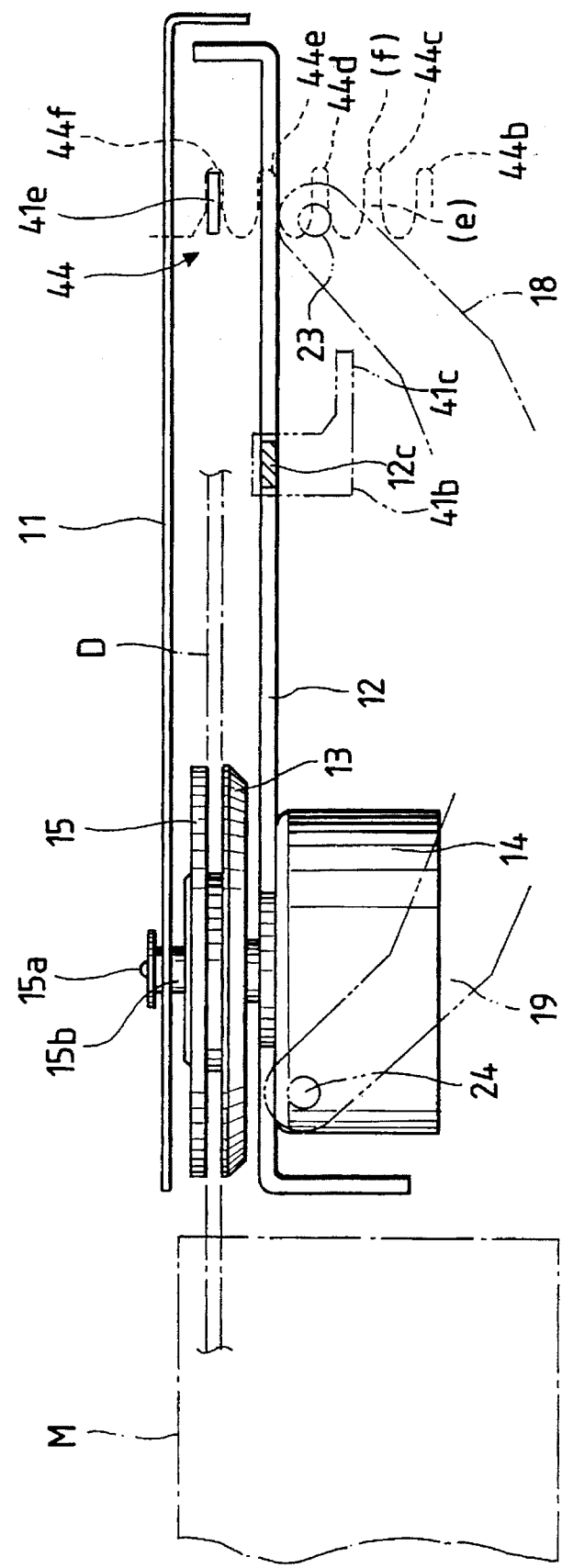
FIG. 4 is a projective front elevational view of a state where a disc is clamped by the first and second moveable chassis.

As shown in FIGS. 3 and 4, a turn table 13, a spindle motor 14 for rotating the turn table 13 and an optical pickup (omitted from the illustration) for playing 1 reproducing information recorded on a disc D to be rotated by the turn table 13 are mounted on the second movable chassis 12. Further, a clamper 15 is supported by the first movable chassis 11. The clamper 15 has a shaft portion 15b which is rotatively supported by the first movable chassis 11. Further, a pivot portion 15a formed at the top end of the shaft portion 15b is supported by a leaf spring 16. As shown in FIG. 3, the leaf spring 16 is supported by the top surface of the first movable chassis 11; the leaf spring 16 urges the clamper 15 in the downward direction when viewed in the drawing.

The second movable chassis 12 is moved upwards/downwards by the force generated by a motor. The structure of the upward/downward moving mechanism will now be described.

Figure 2:
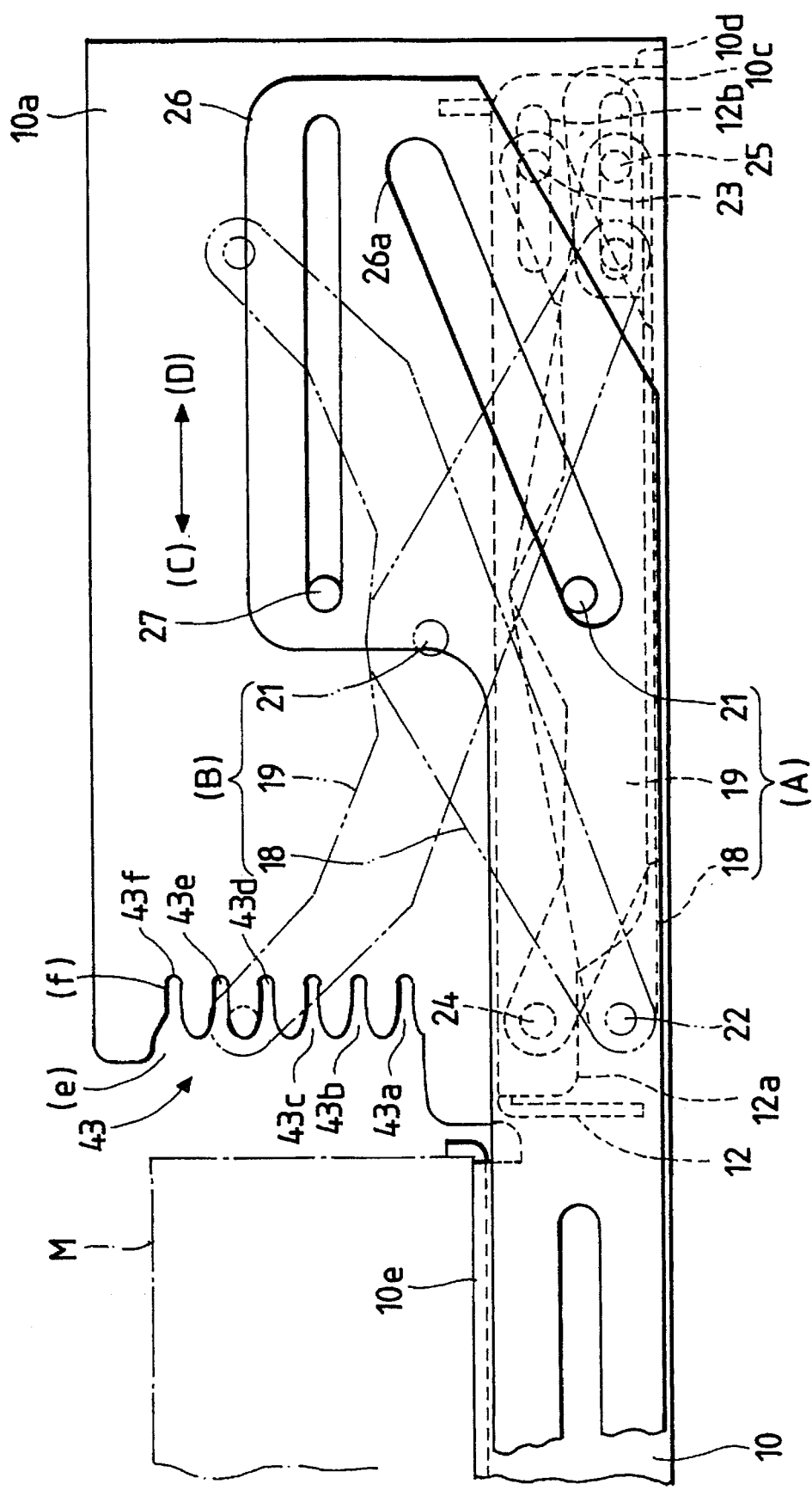
FIG. 2 is a front view taken along line II of FIG. 1 and of a mechanism for moving a moveable chassis.

FIG. 2 is a view taken along line II of FIG. 1. As shown in FIG. 2, the second movable chassis 12 has a bent member 12a. Further, link plates 18 and 19 (constituting an X-link) are disposed on the inside of the bent member 12a. The central portions of the respective link plates 18 and 19 are connected to each other by a connection pin 21. Using the connection pin 21 as the fulcrum, the link plates 18 and 19 are rotatively connected so that they can form an X-shape.

An end of the link plate 18 of the two link plates 18 and 19 is rotatively supported by a fixed supporting-point pin 22 disposed on the inner surface of a front plate 10a of the case 10. Another end of the link plate 18 has a movable supporting-point pin 23 fixed thereto. The movable supporting-point pin 23 is slidably received in an elongated hole 12b formed in the bent member 12a of the second movable chassis 12. An end of the other link plate 19 is rotatively supported by a fixed supporting-point pin 24 fastened to the bent member. 12a of the second movable chassis 12. A movable supporting-point pin 25 fixed to another end of the link plate 19 is slidably received by an elongated hole 10c formed in a support member 10d bent at the bottom portion of the case 10. When the connection pin 21 has been moved downward and accordingly the two link plates 18 and 19 are folded as shown in (A) of FIG. 2, the second movable chassis 12 is moved downwards toward the bottom portion of the case 10. When the connection pin 21 has been moved upwards and accordingly the two link plates are opened as shown in (B) of FIG. 2, the second movable chassis 12 is moved upwards.

As shown in FIG. 1, a drive lever 26 for driving the link plates 18 and 19 is fastened to the outer surface of the front plate 10a of the case 10. The drive lever 26 is guided by guide pins 27 secured to the front plate 10a so that it is able to slide in directions (C)–(D). The drive lever 26 has drive groove 26a formed into an inclined elongated hole so that the connection pin 21 outwardly project through a hole (omitted from the illustration) formed in the front plate 10a to be slidably inserted into the drive groove 26a. When the drive lever 26 has been moved in the direction (D) as shown in FIG. 2, the connection pin 21 is moved downwards. As a result, the link plates 18 and 19 are folded, and the second movable chassis 12 is moved downwards. When the drive lever 26 has been moved in the direction (C), the connection pin 21 is moved upwards by the drive groove 26a. As a result, the link plates 18 and 19 are opened to form an X-shape, causing the second movable chassis 12 is moved upwards.

As shown in FIG. 1, link plates are also disposed on the inside of a rear plate 10b of the case 10, the link plates being deformed to form an X-shape similarly to the link plates 18 and 19 shown in FIG. 2. Similarly to the link plates 18 and 19, the link plates of the rear plate 10b are driven by an inclined drive groove formed in a drive lever 28 disposed on the outside of the rear plate 10b. As a result, the second movable chassis 12 can be moved upwards/downwards by the X-structure link plates acting in the two directions from the front plate 10a and the rear plate 10b. The relationship between fixed supporting-point pins of the link plate adjacent to the rear plate 10b and the movable supporting-point pins is made symmetric to the relationship between the fixed supporting-point pins 22 and 24 and the movable supporting-point pins 23 and 25 of the link plates 18 and 19 adjacent to the front plate 10a. Therefore, when the drive lever 28 is moved in the direction (C), the second movable chassis 12 is moved downwards. When the drive lever 28 is moved in the direction (D), the second movable chassis 12 is moved upwards.

As shown in FIG. 1, a connection lever 31 rotatively supported using a pin 32 as a fulcrum is, in the disc installation portion A, disposed on the reverse side of the bottom plate 10e of the case 10. A pin 33 secured to an end of the connection lever 31 is slidably inserted in an elongated hole 26b formed in a bent portion of the drive lever 26. A pin 34 secured to another end of the connection lever 31 is slidably inserted into an elongated hole 28a formed in the bent portion of the drive lever 28. A rack 35 is secured to the drive lever 28 of the two drive levers 26 and 28. A motor 36 is secured to the reverse side of the bottom plate 10e. The force supplied via a worm gear 37 fastened to an output shaft of the motor 36 is reduced by a reduction-gear group 38. The reduction gear group 38 has a pinion gear 39 at an end thereof, the pinion gear 39 being engaged with the rack 35.

When the rack 35 is driven in the direction (C) by the force of the motor 36, the drive lever 28 fastened integrally with the rack 35 is driven in the direction (D). At this time, the second movable chassis 12 is moved downwards by the link plates 18 and 19 adjacent to the front plate 10a and the link plates adjacent to the rear plate 10b. When the motor 36 outputs reverse-directional rotation, the rack 35 and the drive lever 28 are driven in the direction (D). As a result, the drive lever 26 is driven in the direction (C) via the connection lever 31 so that the second movable chassis 12 is moved upwards.

Since the drive lever 26 has the inclined drive groove 26a formed therein, the other drive lever 28 also has the inclined drive groove and the connection pins 21 of the link plates are continuously driven by the linear drive grooves, the second movable chassis 12 is linearly and upwards/downwards moved in such a manner that the position of the second movable chassis is continuously changed.

A locating/locking mechanism will now be described, the locating/locking mechanism being arranged to mutually lock/unlock the first and second movable chassis 11 and 12 and to locate the two chassis 11 and 12 with respect to the case 10.

FIG. 3 shows the relationship between the first movable chassis 11 and the second movable chassis 12. The second movable chassis 12 is moved upwards/downwards by the X-shape operation of the link plates 18 and 19 as described above. A locating/locking plate 41 having a locking portion therein and serving as a locating member is disposed between the foregoing second movable chassis 12 and the first movable chassis 11 disposed above the second movable chassis 12. The locating/locking plate 41 shown in FIG. 3 is disposed on the inside of the front plate 10a. Further, a locating/locking plate 45 operating in a symmetrical direction to the locating/locking plate 41 is also disposed on the inside of the rear plate 10b of the case 10 shown in FIG. 1.

As shown in FIG. 3, the locating/locking plate 41 has a pair of elongated holes 41a. A pair of pins 42 are secured to a bent member 11a of the first movable chassis 11, the bent member 11a being bent forwards. The pins 42 are inserted into the elongated hole 41a so that the locating/locking plate 41 is able to slide in the directions (C)–(D) with respect to the first movable chassis 11.

The locating/locking plate 41 has a window 41b formed therein, the window 41b having a locking groove 41c serving as a locking portion and formed in the side portion of the bottom portion of the window 41b. The second movable chassis 12 has a locking member 12c projecting toward this side of FIG. 3, the locking member 12c being disposed to align with the window 41b and the locking groove 41c. Further, a locking recess 41h also serving as a locking portion is formed in the lower left portion of the locating/locking plate 41. As shown in FIG. 3, in a state where the locating/locking plate 41 is moved in the direction (C) while being guided by the pins 42, the locking groove 41c and the locking member 12c are engaged with each other. Further, the locking recess 41h is engaged with the fixed supporting-point pin 24 secured to the second movable chassis 12. As a result, the first and second movable chassis 11 and 12 are connected and locked each other by the locating/locking plate 41 while maintaining interval H. The function of the locating/locking plate 45 disposed on the inside of the rear plate 10b has the same function.

The locating/locating plate 41 has locating plates 41d and 41e bent on this side of FIG. 3. As shown in FIG. 1, the front plate 10a of the case 10 has two locating mechanism portions 43 and 44. The locating mechanism portions 43 and 44 respectively have 6-step locating groove 43a to 43f and 44a to 44f serving as locating portions. As shown in FIG. 3, when the locating/locking plate 41 has been moved in the direction (C) and therefore the first and the second movable chassis 11 and 12 are locked mutually, the locating members 41d and 41e are positioned away from the corresponding locating grooves of the locating mechanism portions 43 and 44. When the locating/locking plate 41 has been moved in the direction (D) and therefore the first and the second movable chassis 11 and 12 are unlocked, the locating member 41d is received any one of the locating groove 43a to 43f of the locating mechanism portion 43 immediately before the unlocking. Simultaneously, the locating member 41e is received any one of the locating grooves 44a to 44f of the locating mechanism portion 44 so that the first movable chassis 11 is located with respect to the case 10. For example, FIG. 4 shows a state where the locating member 41e of the locating/locking plate 41 is received by the uppermost locating groove 44f of the locating mechanism portion 44 and the locating member 41d is (omitted from illustration) received by the uppermost locating groove 43f of the locating mechanism portion 43 so that the first movable chassis 11 is located at its uppermost position.

Since the first and the second movable chassis 11 and 12 are unlocked in the state where the first movable chassis 11 is located, further upward movement of the second movable chassis 12 performed by the link plates 18 and 19 causes the disc D ejected from the magazine M is clamped between the two movable chassis 11 and 12 as shown in FIG. 4.

As described above, also the locating/locking plate 45 is disposed on the inside of the rear plate 10b, the locating/locking plate 45 having members equivalent to the locking groove 41c, the locking recess 41h and the locating members 41d and 41e of the locating/locking plate 41 shown in FIG. 3. The locating/locking plate 45 is operated in a symmetric direction to the operation of the locating/locking plate 41 adjacent to the front plate 10a. Therefore, the locating grooves 46a to 46f and 47a to 47f of the corresponding locating mechanisms 46 and 47 are formed in a symmetric direction (reverse direction) to the locating grooves 43a to 43f and 44a to 44f adjacent to the front plate 10a. In the portion adjacent to the rear plate 10b, the first and the second movable chassis 11 and 12 are unlocked and the locating members provided for the locating/locking plate 45 are respectively received by any one of the locating grooves 46a to 46f and 47a to 47f when the locating/locking plate 45 is moved in the direction (C). As a result, the first movable chassis 11 is located with respect to the case 10.

The linkage relationship between the two locating/locking plates 41 and 45 will now be described with reference to FIG. 8 (plan view).

Figure 8:
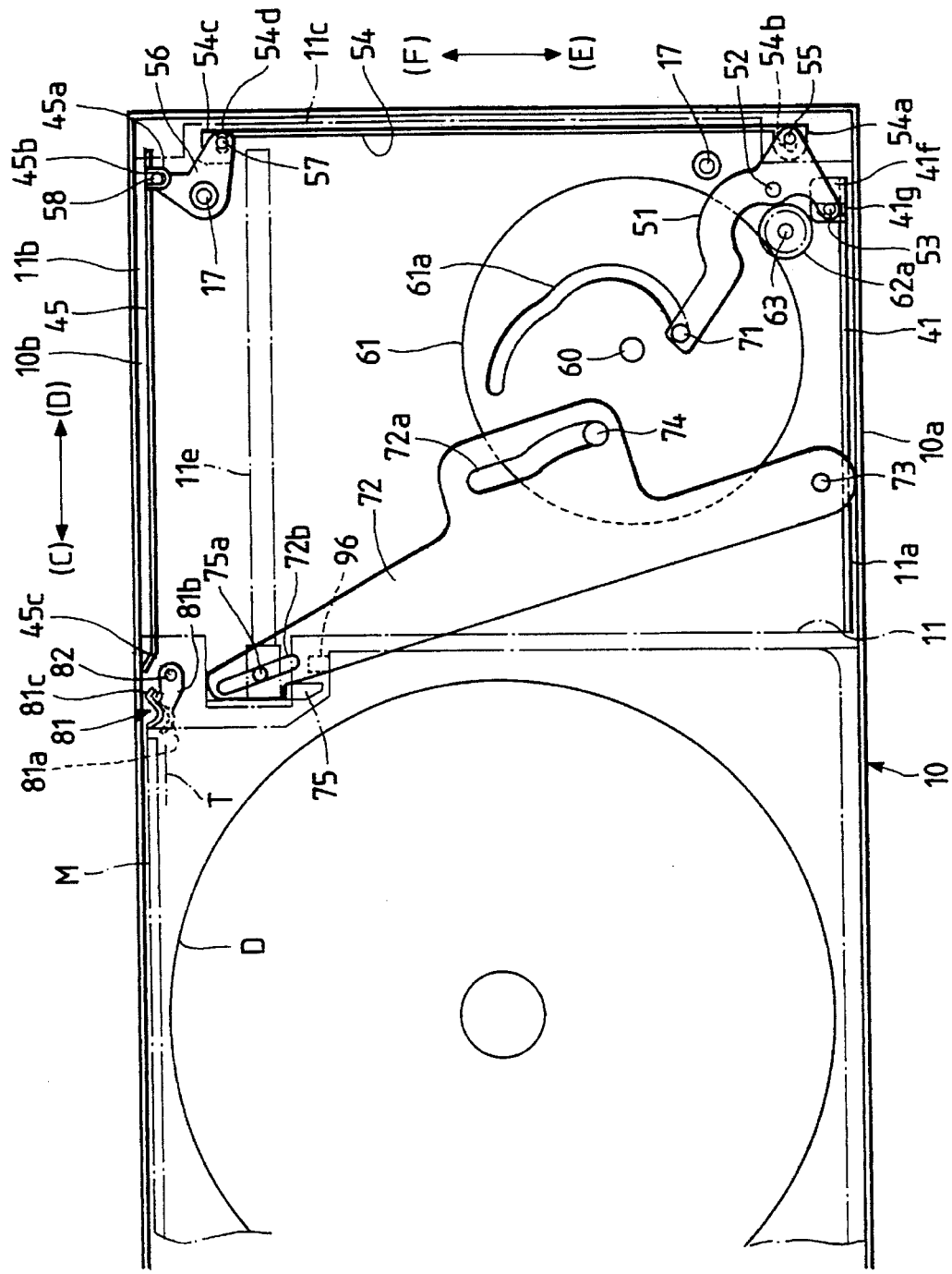
FIG. 8 is a plan view of a state where a tray has not been ejected.

As shown in FIG. 8, the locating/locking plate 41 of the two locating/locking plates 41 and 45 is disposed on the inside of the bent member 11a in the front portion of the first movable chassis 11 in such a manner that it is moveably supported in the directions (C)–(D) with respect to the bent member 11a by the pins 42 shown in FIG. 3. Also the locating/locking plate 45 is disposed on the inside of the bent member 11b bent on the rear side of the first movable chassis 11 in such a manner that it is moveably supported in the directions (C)–(D) with respect to the bent member 11b.

In the upper right portion of the locating/locking plate 41, a bent member 41f is disposed, the bent member 41f having an elongated hole 41g. An interlocking link 51 is rotatively supported on the upper surface of the first movable chassis 11 by a pin 52. A pin 53 secured to the interlocking link 51 is inserted into the elongated hole 41g. In the upper portion of FIG. 8, a linkage lever 54 is supported on the inside of the bent member 11c of the first movable chassis 11 in such a manner that the linkage lever 54 is able to slide in directions (E)–(F). A bent member 54a is disposed at the right end of the linkage lever 54, the bent member 54a having an elongated hole 54b. The foregoing interlocking link 51 has a pin 55 disposed thereon, the pin 55 being inserted into the elongated hole 54b.

As shown in the upper portion of FIG. 8, a second interlocking link 56 is disposed on the reverse side of the first movable chassis 11. The second interlocking link 56 is rotatively supported by the guide shaft 17 which supports the first and the second movable chassis 11 and 12, the second interlocking link 56 being disposed in such a manner that it is able to move upwards/downwards together with the first movable chassis 11. The interlocking lever 54 has a bent member 54c. The bent member 54c has an elongated hole 54d so that a pin 57 disposed on the second interlocking link 56 is inserted into the elongated hole 54d. A bent member 45a disposed on the top end of the locating/locking plate 45 on the rear side has an elongated hole 45b. A pin 58 disposed on the second interlocking link 56 is inserted into the elongated hole 45b. When the interlocking link 51 is rotated counterclockwise in FIG. 8, the locating/locking plate 41 is driven in the direction (D), the interlocking lever 54 is driven in the direction (F) and the locating/locking plate 45 is driven in the direction (C) via the second interlocking link 56.

A large-diameter gear 61 serving as a force conversion mechanism is rotatively supported on the upper surface of the first movable chassis 11 by a shaft 60. The interlocking link 51 and a disc ejection arm 72 to be described later are driven by the large-diameter gear 61.

First, a drive mechanism for rotating the large-diameter gear 61 will now be described.

Figure 5:
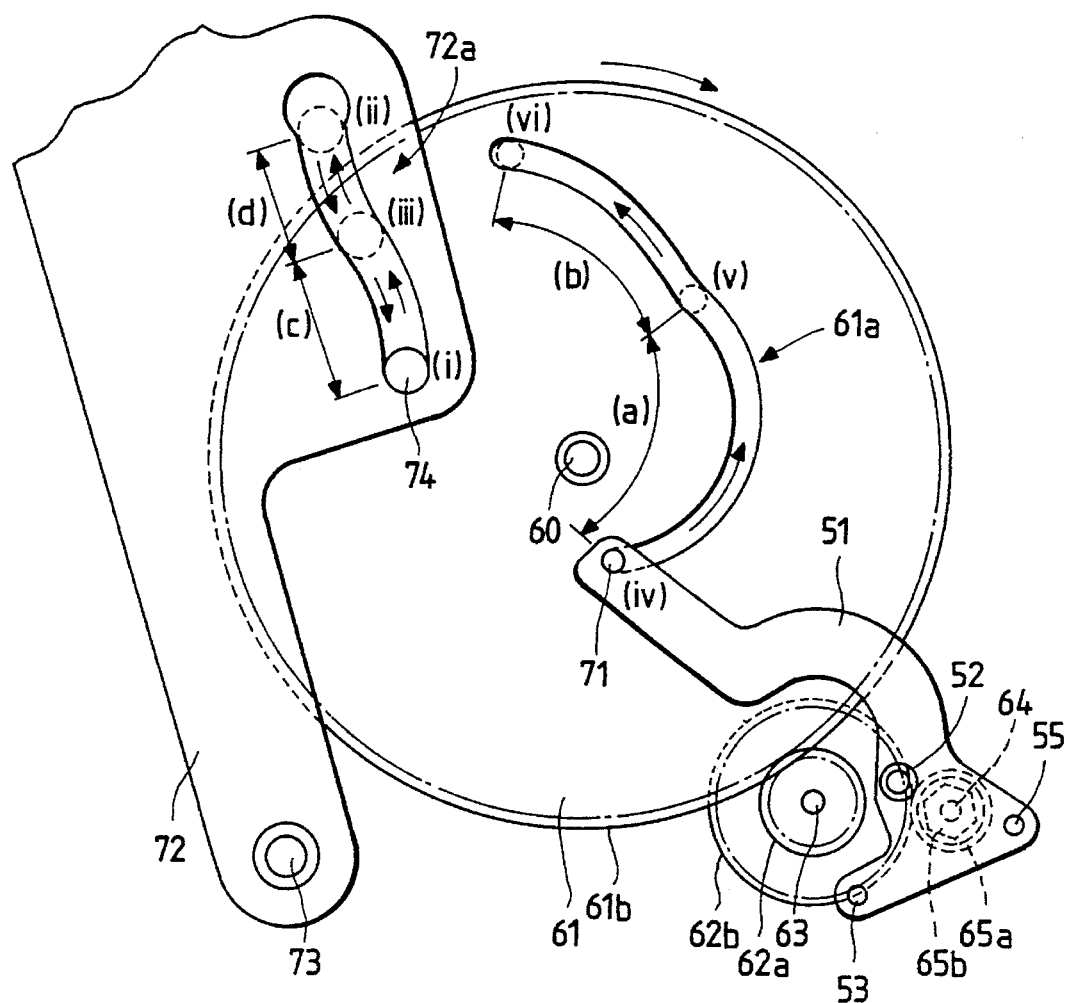
FIG. 5 is an enlarged plan view of the structure of a large-diameter gear.
Figure 7:
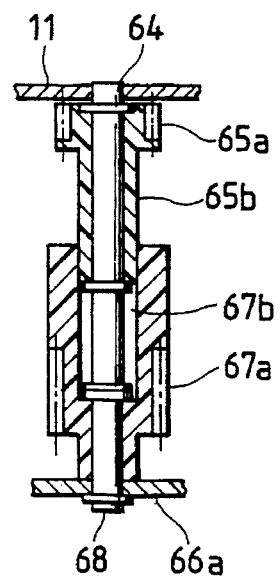
FIG. 7 is cross sectional view of a portion of FIG. 6.
Figure 6:
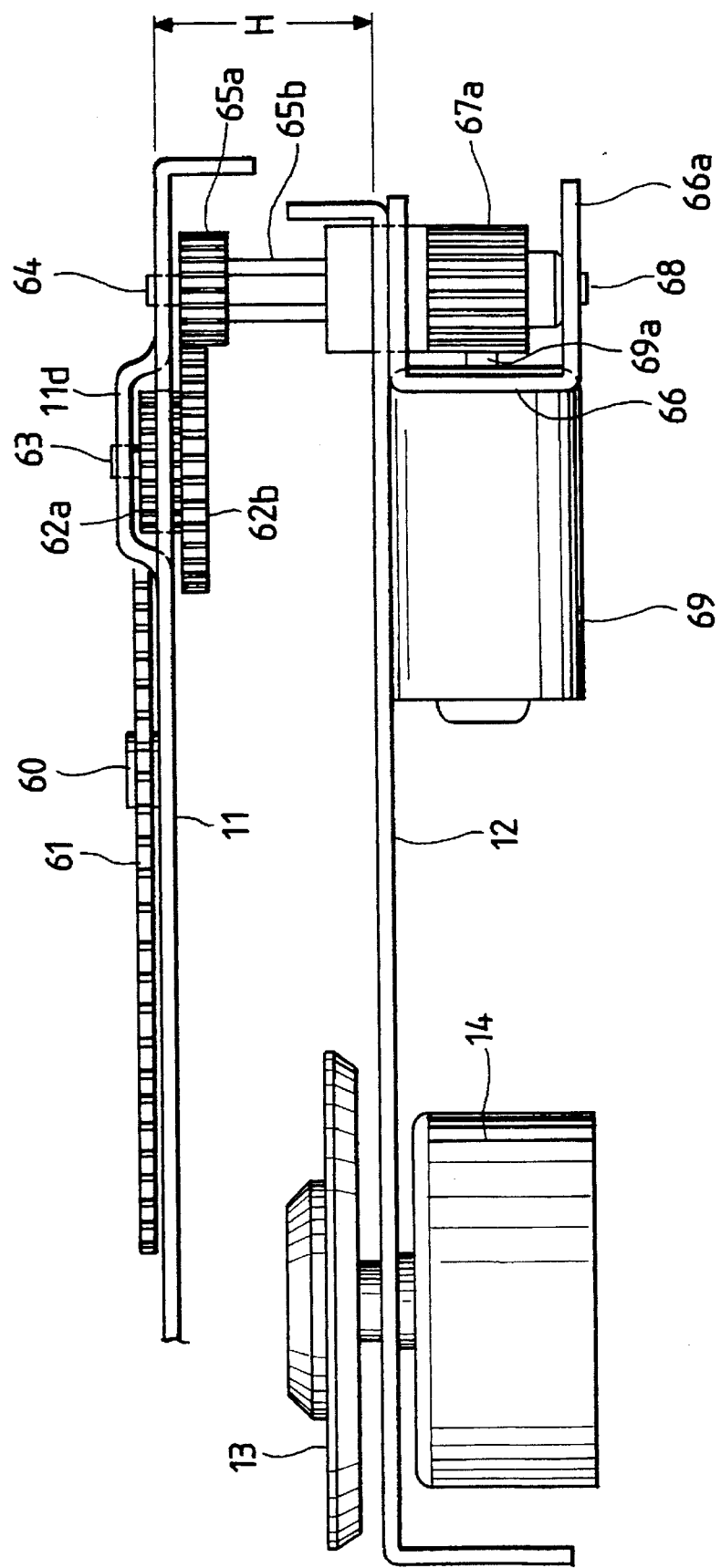
FIG. 6 is a partial front elevational view of a portion for driving the large-diameter gear.

As shown in FIG. 5, a pinion gear 62a is engaged with the gear teeth in the periphery of the large-diameter gear 61. The pinion gear 62a has an intermediate-diameter gear 62b formed integrally therewith. As shown in FIG. 6, a shaft 63 which rotatively supports the pinion gear 62a and the intermediate-diameter gear 62b is secured to a support member 11d expanding on the first movable chassis 11. An upper drive gear 65a is engaged with the intermediate-diameter gear 62b. A hexagonal prism 65b is integrally formed with the lower portion of the upper drive gear 65a. As also shown in FIG. 7 (cross sectional view), the intermediate-diameter gear 62b and the hexagonal prism 65b are rotatively supported by a shaft 64 secured to the first movable chassis 11.

A U-shape gear bracket 66 facing sidewards is secured to the lower surface of the second movable chassis 12. Further, a lower drive gear 67a is rotatively supported by a shaft 68 secured to a bottom plate 66a of the gear bracket 66. The lower drive gear 67a includes a hexagonal hole 67b formed in the upper portion thereof. The hexagonal prism 65b is inserted into the hexagonal hole 67b. That is, the upper drive gear 65a and the lower drive gear 67a are engaged to each other in a spline manner by the hexagonal prism 65b and the hexagonal hole 67b. As a result, the upper drive gear 65a and the lower drive gear 67a are rotated together. When the interval between the first movable chassis 11 and the second movable chassis 12 is shorter than value H, sliding between the hexagonal prism 65b and the hexagonal hole 67b enables the engagement relationship between the two drive gears 65a and 67a to be maintained. Further, a motor 69 is secured to the lower surface of the second movable chassis 12. A worm gear (omitted from illustration) fastened to an output shaft 69a of the motor 69 is engaged to the lower drive gear 67a. The force of the motor 69 is transmitted from the lower drive gear 67a to the upper drive gear 65a, the force being then transmitted to the large-diameter gear 61 via the intermediate-diameter gear 62b and the pinion gear 62a.

Since the motor 69 for driving the large-diameter gear 61 is disposed on the lower surface of the second movable chassis 12 in the same region in which the spindle motor 14 is disposed, the motor 69 does not require a special installation space. Therefore, the reduction of the overall apparatus is not hindered. Since the pinion gear 62a, the intermediate-diameter gear 62b and the drive gears 65a and 67a are disposed on the outside of the disc D ejected into the disc selection/reproduction portion B and as well as in the so-called triangle zone E in a square region formed by tangent lines of a circle corresponding to the outer circumference of the disc D, enlargement of the plane size of the apparatus occurring due to the provision of the gears can be prevented.

A cam groove 61a is formed in the large-diameter gear 61. A follower pin 71 disposed in an arm portion of the interlocking link 51 is slidably inserted into the cam groove 61a.

An ejection arm 72 is fastened on the upper surface of the first movable chassis 11, the ejection arm 72 being rotatively supported on the first movable chassis 11 by a shaft 73. The ejection arm 72 has a cam groove 72a formed therein. A slide pin 74 is provided for the large-diameter gear 61, the slide pin 74 being slidably inserted into the cam groove 72a. The first movable chassis 11 has a linear slide groove 11e. The slide groove 11e slidably supports an ejection hook 75. The ejection hook 75 has a pin 75a formed integrally with the upper surface thereof. The ejection arm 72 has an elongated hole 72b at the leading portion thereof. The pin 75a is inserted into the elongated hole 72b. When the large-diameter gear 61 is driven, the ejection arm 72 is rotated to follow the rotational locus of the slide pin 74. As a result, the ejection hook 75 is moved along the slide groove 11e. During the right directional sliding movement of the ejection hook 75 from a position shown in FIG. 8 to a position shown in FIG. 9, a selected tray T1 in the magazine M is taken to a disc clamping position in the disc selection/reproduction portion B.

FIG. 5 is an enlarged view which illustrates the cam groove 61a formed in the large-diameter gear 61 and the cam groove 72a formed in the ejection arm 72.

The cam groove 61a formed in the large-diameter gear 61 has a first curve portion (a) and a second curve portion (b). The cam groove 72a formed in the arm 72 has a circular arc portion (c) and a straight portion (d). When the large-diameter gear 61 has been rotated clockwise from a phase shown in FIGS. 5 and 8 to a phase shown in FIG. 9, the ejection arm 72 is rotated clockwise by the slide pin 74 and the ejection hook 75 has been moved to the right end shown in FIG. 9, the circular arc portion (c) of the cam groove 72a is positioned on the locus of a circular arc having a curvature around the shaft of the large-diameter gear 61.

In the state shown in FIG. 5, the large-diameter gear 61 has been counterclockwise rotated by the largest angular degree and the ejection arm 72 has been moved counterclockwise by the slide pin 74. Further, the follower pin 71 provided for the interlocking link 51 is positioned at an end of the first curve portion (a) of the cam groove 61a. Since the interlocking link 51 has been rotated clockwise at this time, the locating/locking plate 41 has been moved in the direction (C) shown in FIG. 8 via the interlocking link 51 and the locating/locking plate 45 positioned symmetrically to the locating/locking plate 41 has been moved in the direction (D).

When the large-diameter gear 61 is driven clockwise by the force of the motor 69 (see FIG. 6) from the state shown in FIG. 5, the slide pin 74 slides within the cam groove 72a. As a result, the ejection arm 72 is driven clockwise. The slide pin 74 slides within the cam groove 72a on a sliding locus starting from position (i), which is the groove start, to position (ii), which is the groove end, and returning through straight portion (d) until it reaches position (iii) at the center of the groove. In the period in which the slide pin 74 slides to the position (iii), the ejection hook 75 is moved to the right end shown in FIG. 8 along the slide groove 11e formed in the first movable chassis 11 so that the tray T1 in the magazine M is completely ejected by the ejection hook 75. However, the follower pin 71 is, at this time, limitedly moved from position (iv), which is the start of the groove, to position (v) which is the end of the first curve portion (a). In a period in which the follower pin 71 is moved from the position (iv) to the position (v), the interlocking link 51 is slightly moved counterclockwise so that the quantity of the movement of the locating/locking plate 41 in the direction (D) and that of the locating/locking plate 45 in the direction (C) are very small. The quantity of the movement of the locating/locking plate 41 in the direction (D) is very small. With reference to FIG. 3, the locking groove 41c therefore is not separated from the locking member 12c at this time, the locking recess 41h is not separated from the fixed supporting-point pin 24, and the locating members 41d and 41e are not received by the locating grooves in the locating mechanisms 43 and 44.

When the ejection hook 75 has been moved to the right end shown in FIG. 8 and then the large-diameter gear 61 has been rotated clockwise, the slide pin 74 is simply moved within the circular arc portion (c) of the cam groove 72a at the circular-arc position around the shaft 60 as shown in FIG. 9 but the angle of the ejection arm 72 is not changed.

In the period in which the slide pin 74 slides within the circular arc portion (c), the follower pin 71 slides within the second curve portion (b) of the cam groove 61a. The second curve portion (b) causes the interlocking link 51 to be considerably rotated counterclockwise. At this time, the locating/locking plate 41 is considerably moved in the direction (D) by the interlocking link 51. Further, the locating/locking plate 45 is considerably moved in the direction (C) via the connection lever 54 and the second interlocking link 56.

That is, the ejection arm 72 is driven clockwise during the clockwise rotation of the large-diameter gear 61 from the phase shown in FIG. 5 to the phase shown in FIG. 9. As a result, the ejection hook 75 is driven to the right when viewed in FIG. 9 so that the tray T1 selected from trays in the magazine M is pulled out. After the tray T1 has been pulled out, the locating/locking plates 41 and 45 are considerably driven during the further clockwise rotation of the large-diameter gear 61. With reference to FIG. 3 for example, the movement of the locating/locking plate 41 in the direction (D) causes the locking groove 41c to be separated from the locking member 12c and causes the locking recess 41h to be separated from the fixed supporting-point pin 24. As a result, the two moveable chassis 11 and 12 are unlocked, and immediately before this, the locating members 41d and 41e are received by any one of the locating grooves of the locating mechanism portions 43 and 44. Therefore, the locating/locking plate 41 and the first moveable chassis 11 are located with respect to the case 10. The locating/locking plate 45 is operated similarly so that the movement of the locating/locking plate 45 in the direction (C) performed after the ejection arm 72 has been rotated clockwise locates the first moveable chassis 11. Further, the first and the second moveable chassis 11 and 12 are unlocked.

Figure 12:
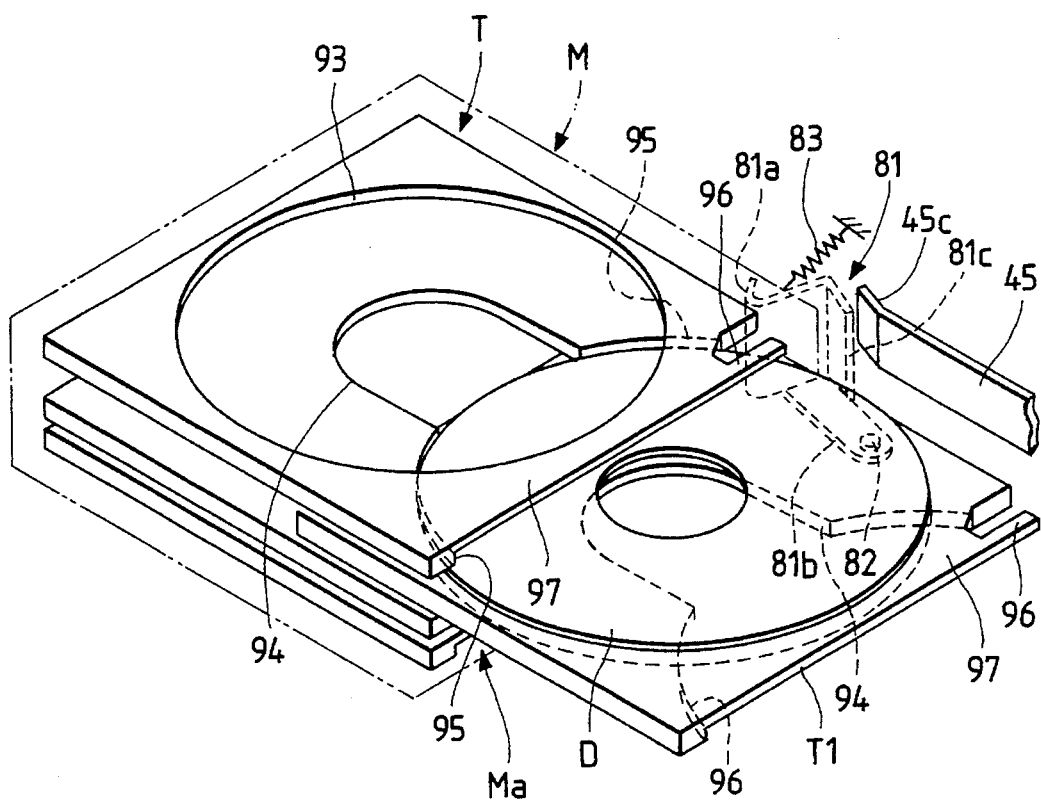
FIG. 12 is a perspective view of the internal structure of the magazine.
Figure 13:
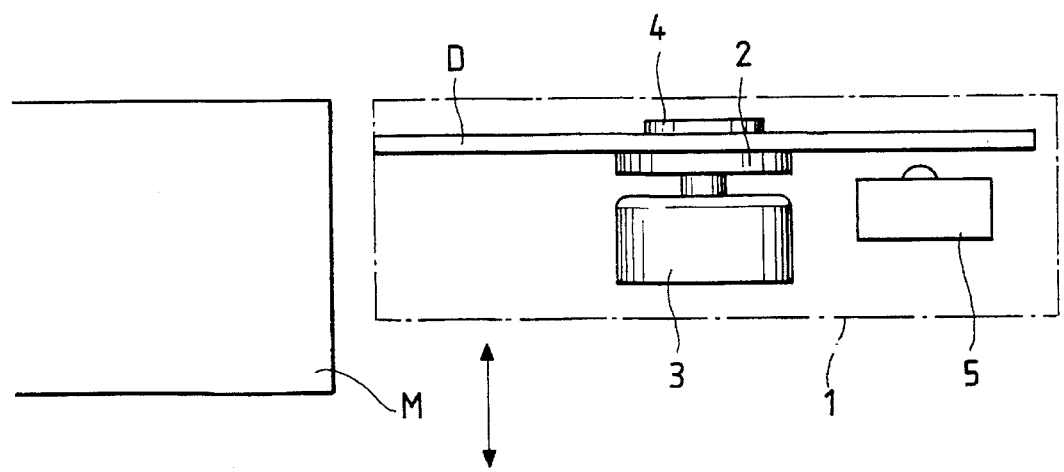
FIG. 13 is a view of a conventional disc selectable player.

By driving the locating/locking plates 41 and 45 after the ejection arm 72 has completed the ejection operation, the operation timing of a restriction member 81, to be described later can be determined, the restriction member 81 being provided to prevent undesirable ejection of the tray. FIGS. 8 and 9 illustrates the plane shape of the restriction member 81. FIG. 12 illustrates the relationship between the restriction member 81 and the magazine M.

The restriction member 81 comprises a V or U-shape restriction tag 81a made by bending a plate, an inclined tag 81c formed continuously from the restriction tag 81a and a support tag 81b formed integrally with the base portion of the inclined tag 81c. The support tag 81b is rotatively supported by a shaft 82 disposed on the bottom plate 10e of the case 10. The restriction member 81 is urged clockwise by a spring 83. The foregoing urging force usually rotates the restriction tag 81a to a position designated by a dashed line shown in FIG. 8. In this state, the restriction tag 81a is relieved sidewards from a passage through which the tray T is pulled out so that the operation of pulling out the tray T is not hindered. As described above, the rotation of the large-diameter gear 61 first rotates the ejection arm 72 to pull out the tray T1 by the ejection hook 75. After the tray T1 has been pulled out, the locating/locking plate 45 is considerably driven in the direction (C). At this time, an inclined pressing member 45c of the locating/locking plate 45 formed at the left end portion shown in the drawing presses the inclined tag 81c of the restriction member 81. As a result, the restriction member 81 is rotated to a position designated by a continuously line shown in FIGS. 8 and 9 to stop the forward portion of the tray left in the magazine M so that the undesirable ejection of the tray T from the magazine M is prevented. Since the restriction tag 81a of the restriction member 81 is, as shown in FIG. 9, positioned in the rear of the circular arc portion 91 on the side of the ejected tray T1 is this state, the undesirable return of the ejected tray T into the magazine M can be prevented.

The structure of the magazine M to be loaded in the disc installation portion A shown in FIG. 1 will now be described.

Figure 10:
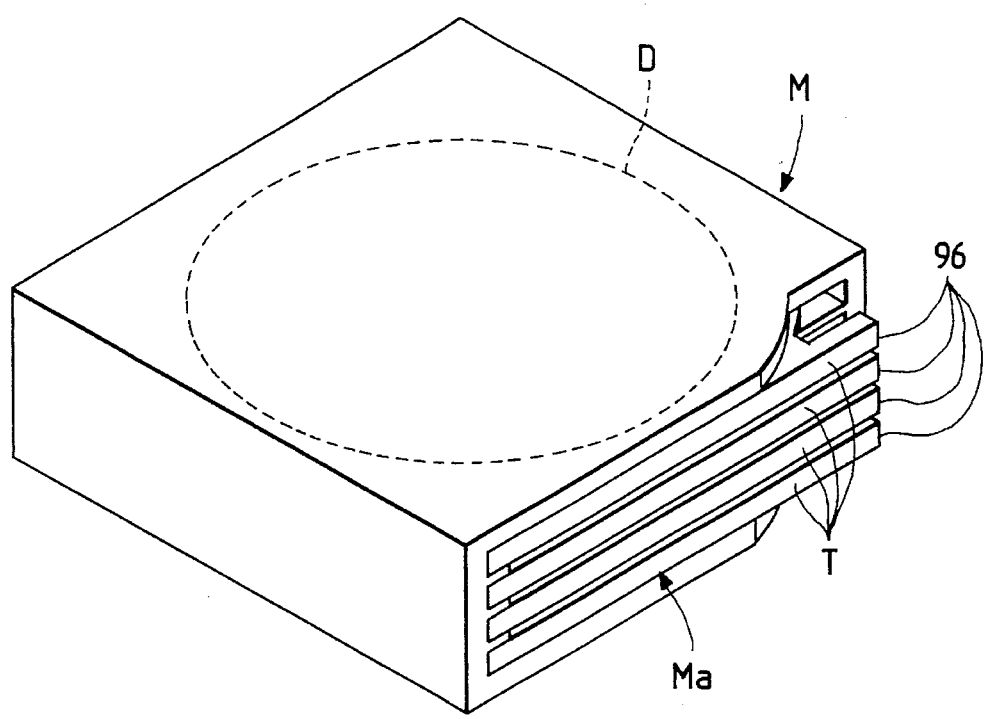
FIG. 10 is a perspective view of a magazine when viewed from a diagonally upper position.
Figure 11:
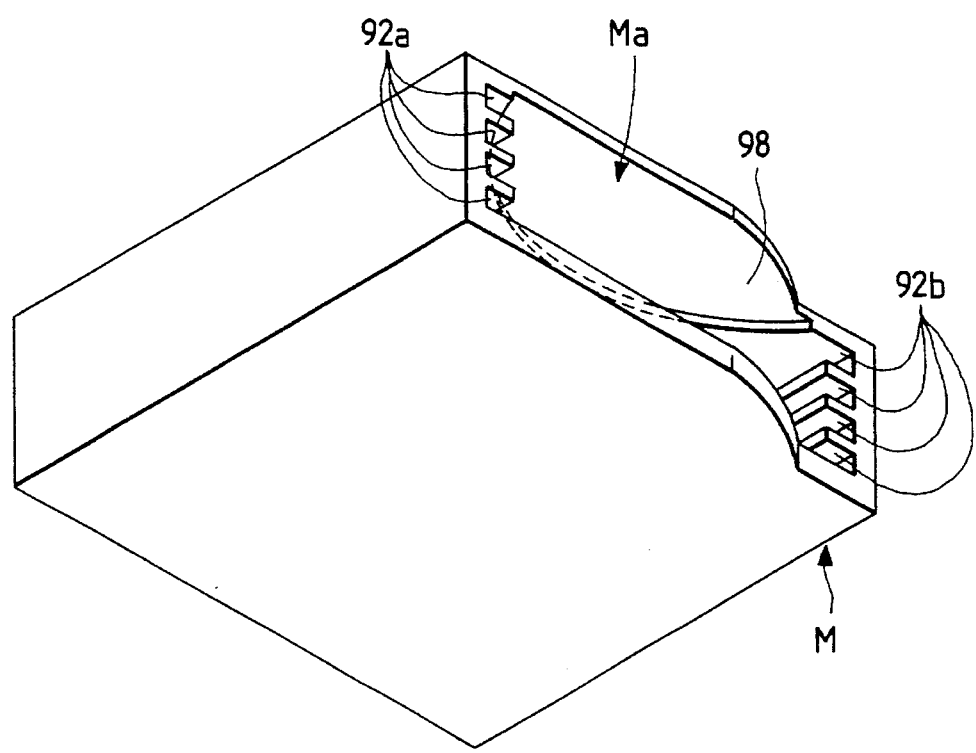
FIG. 11 is a perspective view of the magazine when viewed from a diagonally lower position.

FIG. 10 is a perspective view which illustrates the magazine M when it is viewed from a diagonally upper position. FIG. 11 is a perspective view which illustrates the magazine M when viewed from a diagonally lower position. FIG. 12 is a perspective view which illustrates the internal structure of the magazine M.

A plurality of the trays T are accommodated in the magazine M, each tray T having the disc D placed thereon. The disc selectable player shown in FIG. 1 has the 6-step locating grooves 43a to 43f and 44a to 44f for the corresponding locating mechanism portions 43, 44, 46 and 47 formed on the front plate 10a and the rear plate 10b. Further, the height of each of the locating/locating plates 41 and 45 connected to the first moveable chassis 11 can be locked at any one of the 6 steps to select any one of the 6 trays T. The magazine M shown in FIG. 12 accommodates four trays T in order to easily draw the structure.

As shown in FIG. 11, plural-step slide grooves 92a and 92b are formed in the inner surface of the two side walls of the magazine M. Each tray T is slidably accommodated in the slide grooves 92a and 92b. Further, the trays T can be respectively ejected through the ejection port Ma of the magazine M.

As shown in FIG. 12, a circular accommodating recess 93 for placing the disc D is formed in the upper surface of each of the tray T. Further, a U-shape central hole 94 is formed by cutting the bottom portion of the accommodating recess 93. In addition, the lower surface of a front plate 97 of the tray T has a downward recess 95 formed into a partially circular shape continued from the foregoing central hole 94. When a tray T1 has been ejected and the disc D placed on the tray T1 has been raised, the disc D is separated from the accommodating recess 93 of the ejected tray T1 to be positioned between the accommodating recess 93 and the partially circular recess 95 formed in the lower surface of the ejected tray T1 so that the disc D is rotated. Also a partially circular recess 98 is formed in the inner surface of a ceiling plate of the magazine M as shown in FIG. 11. Therefore, when the uppermost tray T has been pulled out, the disc D placed on the ejected tray T is raised so that the disc D is driven in a space between the accommodating recess 93 and the foregoing recess 98.

Further, a projection 96 to which the ejection hook 75 is engaged is formed in the front portion of each tray T.

The sequential operation of the disc selectable plate thus structured will now be described.

State where no disc is selected

When no reproduction of the disc D is performed, the large-diameter gear 61 disposed on the top surface of the first moveable chassis 11 is rotated counterclockwise to the phase shown in FIGS. 1, 5 and 8. At this time, the slide pin 74 of the large-diameter gear 61 is positioned at the start of the groove of the circular arc portion (c) of the cam groove 72a of the ejection arm 72 so that the ejection arm 72 has been rotated counterclockwise.

The follower pin 71 provided for the interlocking link 51 is positioned at the start of the groove of the first curve portion (a) of the cam groove 61a of the large-diameter gear 61 and the interlocking link 51 has been rotated clockwise. Therefore, the locating/locking plate 41 connected to the interlocking link 51 via the pin 53 has been moved to the direction (C). Further, the connection lever 54 connected to the interlocking link 51 via the pin 55 has been moved to the direction (E) shown in FIG. 8. The locating/locking plate 43 connected to the connection lever 54 via the second interlocking link 56 has been moved to the direction (D).

In the state where the locating/interlocking plate 41 has been moved to the direction (C) as shown in FIG. 3, the locking groove 41c formed in the locating/locking plate 41 is engaged to the locking member 12c projecting over the second moveable chassis 12. Further, the locking recess 41h is engaged to the fixed supporting-point pin 24 secured to the second moveable chassis 12. Since the locating/locking plate 41 is supported by the pins 42 of the first moveable chassis 11, the first and the second moveable chassis 11 and 12 are mutually locked at a predetermined vertical interval H via the locating/locking plate 41.

The pair of locating members 41d and 41e of the locating/locking plate 41 are separated from all of the locating grooves 43a to 43f and 44a to 44f of the locating mechanism portions 43 and 44 of the front plate 10a of the case 10. Therefore the first moveable chassis 11 is not located with respect to the case 10. The locating/locking plate 45 positioned symmetrically to the locating/locking plate 41 is operated similarly. At this time, the first and the second moveable chassis 11 and 12 are mutually locked via the locating/locking plate 45. Further, the locating/locking plate 45 is not engaged to the locating grooves 46a to 46f and 47a to 47f of the locating mechanism portions 46 and 47 of the rear plate 10b.

Since the locating/locking plate 45 has been moved in the direction (D), the pressing member 45c formed at the left end portion shown in the drawing is separated from the restriction member 81. The restriction member 81 has an attitude designated by a dashed line shown in FIG. 8 due to the urging force of the spring 83 shown in FIG. 12.

The magazine M is loaded in the foregoing state. The magazine M is loaded in a direction designated by an arrow while causing the ejection port Ma to face the disc selection/reproduction portion B. When the magazine M has been loaded, the ejection hook 75 moved in the left direction of the drawing is introduced into the inside of the projection 96 of any one of the trays T.

Disc selection operation

The operation of selecting the tray T, on which a desired disc D is placed, is performed by driving the motor 36 shown in FIG. 1. The force of the motor 36 is transmitted from the reduction gear group 38 to the rack 35 via the pinion gear 39 so that the rack 35 is driven to the directions (C)–(D). Simultaneously, the drive lever 28 is driven in the same direction. The foregoing force is transmitted to the other drive lever 26 via the connection lever 31 so that the two drive levers 28 and 26 are sequentially driven in the symmetrical directions. As shown in FIG. 2, the inclined drive groove 26a formed in the drive lever 26 moves upwards/downwards the connection pin 21 so that the link plates 18 and 19 are closed or opened in the form of the X-shape. Since the link plate 18 is disposed between the front plate 10a and the second moveable chassis 12 by the fixed supporting-point pin 22 and the moveable supporting-point pin 23 and also the link plate 19 is disposed between the support member 10d of the case and the second moveable chassis 12 by the fixed supporting-point pin 24 and the moveable supporting-point pin 25, the X-shape opening or closing operation of the link plates 18 and 19 causes the second moveable chassis 12 to be moved vertically.

Since the first moveable chassis 11 and the second moveable chassis 12 are mutually locked by the locating/locking plates 41 and 45, the first moveable chassis 11 vertically moves together with the second moveable chassis 12 while maintaining the interval H.

The vertical movements of the first and the second moveable chassis 11 and 12 cause the tray T in the magazine M to be selected. The control of the selection position is performed in such a manner that the first and the second moveable chassis 11 and 12 are moved to the lowest position when the magazine M has been loaded for example. At this time, the motor 36 shown in FIG. 1 is started to continuously raise the second moveable chassis 12 by the drive levers 26, 28, the link plates 18 and 19. The time for which the motor 36 is rotated or the number of the rotations is counted by an encoder disposed in the passage through which protrudes the shaft of the motor 36. As an alternative to this, movement can be controlled by using a detection member provided for detecting the position to which the rack 35 or the drive levers 26 and 28 have been moved linearly, or the distance for which the foregoing elements have been moved. By any one of the employed detection operations, the vertical positions of the first and the second moveable chassis 11 and 12 are detected and controlled.

When the first and the second moveable chassis 11 and 12 have been moved to the ejection position for a predetermined disc D (tray T), the motor 36 is stopped.

Then, the motor 69 (see FIG. 6) disposed on the reverse side of the second moveable chassis 12 is rotated. The rotation of the output shaft 69a of the motor 69 is transmitted from a worm gear (omitted from illustration) to the lower drive gear 67a. The foregoing rotational force is transmitted to the upper drive gear 65a due to the spline connection established between the hexagonal hole and the hexagonal prism shown in FIG. 7. The rotational force of the upper drive gear 65a is transmitted to the intermediate-diameter gear 62b, and it is transmitted from the pinion gear 62a disposed integrally with the intermediate-diameter gear 62b to the large-diameter gear 61. As a result, the large-diameter gear 61 is driven clockwise.

As a result of the clockwise rotation of the large-diameter gear 61 by a predetermined angle, the slide pin 74 of the large-diameter gear 61 slides within the cam groove 72a of the ejection arm 72. During the movement performed from the groove start at the position (i) to return to the groove intermediate position (iii) via the groove end at the position (ii) shown in FIG. 5, the ejection arm 72 is driven clockwise. As a result, the ejection hook 75 connected to the leading portion of the ejection arm 72 is moved from the position shown in FIG. 8 to the right when viewed in the drawing. At this time, the ejection hook 75 pulls the projection 96 of the selected tray T1 in the magazine M so that the tray T1 is ejected to a space between the first moveable chassis 11 and the second moveable chassis 12.

At this time, the follower pin 71 of the interlocking link 51 is moved from the start position (iv) of the cam groove 61a shown in FIG. 5 to the end position (v) of the first curve portion (a). During the foregoing movement the locus of which is as described above, the interlocking link 51 rotates counterclockwise by a small angular amount. Therefore, the locating/locking plate 45 to be driven by the interlocking link 51 and the connection lever 54 shown in FIG. 8 are moved in the direction (D). Therefore the pressing member 45c disposed at the left of the locating/locking plate 45 is separated from the restriction member 81. As a result the restriction member 81 is rotated clockwise due to the elastic force of the spring 83 (see FIG. 12) and has the attitude designated by the dashed line shown in FIG. 8. Therefore the movement passage for the tray T1 to be ejected from the magazine M is not hindered.

Locating operation of first moveable chassis

When the ejection arm 72 has been rotated clockwise and therefore the tray T1 has been pulled to the right in the drawing, the follower pin 71 of the interlocking link 51 is positioned at position (v) in the cam groove 61a. When the large-diameter gear 61 is continuously clockwise driven, the follower pin 71 is moved to the groove end (vi) along the second curve portion (b) of the cam groove 61a. In an ensuing period during which the follower pin 71 is moved from the position (v) to the position (vi), the interlocking link 51 is driven counterclockwise by a considerable amount. At this time, the slide pin 74 is simply moved within the circular arc portion (c) of the cam groove 72a at the position shown in FIG. 9. Therefore, the position of the ejection arm 72 is maintained at the position shown in FIG. 9.

When the interlocking link 51 has been considerably driven counterclockwise, by a considerable amount the locating/locking plate 41 is driven in the direction (D). Further, the locating/locking plate 45 positioned symmetrical to the locating/locking plate 41 is driven in the direction (C) by the connection lever 54 and the second interlocking link 56 (see FIG. 8).

When the locating/locking plate 41 is driven in the direction (D) shown in FIG. 3, the engagement between the locking groove 41c and the locking member 12c is lost. Further, the locking recess 41h is separated from the fixed supporting-point pin 24 so that the two moveable chassis 11 and 12 are unlocked. Immediately before unlocking, the locating members 41d and 41e of the locating/locking plate 41 are engaged in any one of the locating grooves 43a to 43f and 44a to 44f of the locating mechanism portions 43 and 44 of the front plate 10a of the case 10. The locating/locking plate 45 (positioned symmetrically) is moved in the direction (C), the locating/locking plate 45 causing the first and the second moveable chassis 11 and 12 to be unlocked. Further, the locating member of the locating/locking plate 45 is engaged to any one of the locating grooves 46a to 46f and 47a to 47f of the locating mechanisms 46 and 47 of the rear plate 10b. The engagements of the two locating/locking plates 41 and 45 to the locating mechanisms 43, 44, 46 and 47 of the front plate 10a and the rear plate 10b cause the first moveable chassis 11 to be located with respect to the case 10 via the locating/locking plates 41 and 45.

FIG. 4 illustrates the case where the uppermost tray T in the magazine M is selected. In this case, the locating member 41e of the locating/locking plate 41 is engaged to the uppermost locating groove 44f of the locating mechanism portion 44, while the locating member 41d is engaged to the uppermost locating groove 43f of the locating mechanism portion 43. At this time, the locating/locking plate 45 positioned symmetrically is engaged to the uppermost locating grooves 46f and 47f of the locating mechanisms 46 and 47 to be located. In a case where the second tray T in the magazine M when viewed from an upper position is selected, the heights of the moved first and the second moveable chassis 11 and 12 are somewhat lower than the those in the foregoing case. The locating members 41d and 41e of the locating/locking plates 41 and 45 are engaged to the second locating grooves 43e, 44e, 46e and 47e of the locating mechanism portions 43, 44, 46 and 47 when viewed from an upper position.

In this embodiment, the locating grooves of the respective locating mechanism portions 43, 44, 46 and 47 are formed in the front plate 10a and the rear plate 10b of the case 10. Further, the magazine M is disposed on the bottom plate 10e of the case 10. Therefore, by improving the machining accuracy of the positions of the locating grooves of the locating mechanism portions 43, 44, 46 and 47 and that of the bending position of the bottom plate 10e and by minimizing the looseness (the looseness between the pin 42 and the elongated hole 41a shown in FIG. 3) between the locating/locking plates 41, 45 and the first moveable chassis 11, the first moveable chassis 11 can be caused to accurately face the selected tray T in the magazine M.

The locating grooves 43a to 43f and 44a to 44f of the locating mechanism portions 43, 44, 46 and 47 are, as shown in FIGS. 2 and 4 and so forth, formed into a shape having a V-shape opening portion (e) and an ensuing thin engagement portion (f). Therefore even if the heights to which the moveable chassis 11 and 12 have been brought somewhat disperse and even if the heights at which the locating members 41d and 41e of the locating/locking plate 41 are stopped involve an error, each of the locating members 41d and 41e can be assuredly introduced into the engagement portion (f) of the locating groove when the locating/locking plate 41 is moved in the direction (D). As a result, the first moveable chassis can be located at an accurate height. Even if vibrations of the vehicle act on the apparatus mounted on the vehicle, looseness between the locating/locking plates 41, 45 and the first moveable chassis 11 is prevented.

Since the locating/locking plate 45 positioned symmetrically is moved in the direction (C) shown in FIG. 8, the left-end pressing member 45c presses the inclined member 81c of the restriction member 81. The restriction member 81a is made to have the attitude designated by a continuous line shown in FIG. 8 to block the front portion of the other tray T. As a result, an undesirable ejection of a tray T, which is not selected, from the magazine M can be prevented. Further, the restriction member 81 prevents undesirable return of the selected and ejected tray T1 into the magazine M.

When a predetermined tray T1 has been ejected, the first and the second moveable chassis 11 and 12 have been unlocked, and the locating/locking plate 41 has been engaged into the locating mechanism portion of the case 10 so that the first moveable chassis 11 has been located, the motor 69 shown in FIG. 6 is stopped.

Disc clamping Operation

Then, the motor 36 shown in FIG. 1 is again started, the rack 35 and the drive lever 28 are driven in the direction (D), and the drive lever 26 is driven in the direction (C). The drive groove 26a of the drive lever 26 moving in the direction (C) raises the connection pin 21 so that the X-formation formed by the link plates 18 and 19 is opened. As a result, the second moveable chassis 12 is further moved upwards. Since locking of the second moveable chassis 12 by the locating/locking plate 41 is cancelled at this time and the first moveable chassis 11 has been located, only the second moveable chassis 12 is moved upwards. During the foregoing upward movement process, the turn table 13 is engaged to the central hole of the disc D on the ejected tray T1. Further, the disc D is somewhat raised from the accommodating recess 93 of the tray T1 (see FIG. 12). Then, the disc D is held and clamped between the clamper 15 of the first moveable chassis 11 and the turn table 13.

At this time, the disc D is slightly raised from the accommodating recess 93 of the ejected tray T1 while leaving a portion in the magazine M as shown in FIG. 12. As a result, the disc D is positioned in a space between the partially-circular recess 95 formed in the lower surface of the tray T, which is positioned above the accommodating recess 93, or the recess 98 (see FIG. 11) formed in the lower surface of the ceiling plate of the magazine M and the accommodating recess 93.

In this state, the disc D is driven by the spindle motor 14 so that the reproduction operation is performed by the pickup of the second moveable chassis 12.

Disc returning operation

When the disc D, which has been played/reproduced, is returned to the magazine M, the second moveable chassis 12 is moved downwards by the motor 36 shown in FIG. 1. As a result, the disc D raised by the turn table 13 is returned to the accommodating recess 93 of the tray T1. When the second moveable chassis 12 is further lowered to be positioned at interval H from the first moveable chassis 11, the motor 36 is stopped and the downward movement of the second moveable chassis 12 is stopped.

Then, the large-diameter gear 61 is driven counterclockwise by the motor 69 shown in FIG. 6. The counterclockwise rotation of the large-diameter gear 61 causes the locating/locking plate 41 to be driven in the direction (C) and the locating/locking plate 45 to be driven in the direction (D) via the interlocking link 51. As a result, locking of the case 10 with respect to the locating mechanisms 43, 44, 46 and 47 is cancelled. Further, the locating/locking plates 41 and 45 are mutually locked in a state where the first and the second moveable chassis 11 and 12 are disposed at the interval H.

When the large-diameter gear 61 is further rotated counterclockwise, the ejection arm 72 is driven counterclockwise. As a result, the ejection hook 75 is moved to the left as shown in FIG. 8 so that the tray T1 is returned to the magazine M.

The present invention is not limited to the foregoing embodiment.

Although the foregoing embodiment comprises the locating grooves 43a to 43f and so forth directly formed in the case 10 to serve as locating portions for locating the moveable portion composed of the two moveable chassis 11 and 12, a member having the locating grooves formed therein may be fastened to the case 10. Another structure may be employed in which a locating member having a V-shape groove is provided for the moveable chassis and plural-step projections serving as the locating portions are provided for the case whereby the V-shape groove formed in the moveable chassis and serving as the locating member is engaged to any one of the plural-step projections.

Although the foregoing embodiment has the arrangement that the first moveable chassis 11 serving as the upper chassis is fixedly located and the second moveable chassis 12 serving as the lower chassis is moved upwards to clamp the disc D between the two moveable chassis, in another arrangement the first moveable chassis is the lower chassis, the second moveable chassis is the upper chassis, the first moveable chassis serving as the lower chassis is fixedly located, and the second moveable chassis serving as the upper chassis is further moved downwards to clamp the disc between the two moveable chassis.

Further, a clamper may be provided for the second moveable chassis, and the turn table and the pickup may be provided on the first moveable chassis.

In another structure, the first moveable chassis maintains the predetermined interval H from the second moveable chassis by a spring, the second moveable chassis is moved to locate the first moveable chassis to a predetermined position, and the spring is compressed to cause the second moveable chassis to approach the first moveable chassis so as to clamp the disc between the two moveable chassis.

The discs may be of any type, for example, compact discs, magnetic discs, hard discs, photomagnetic discs or microdevices. Further, the structure is not limited to the disc being accommodated in the magazine. A predetermined number of discs may be accommodated in the disc installation portion A.

Further, the present invention is not limited to a disc selectable player for a vehicle, but the prevent invention may be applied to a disc player for indoor use.

As described above, according to the present invention, when the moveable portion is moved to the position at which a selected disc is ejected, the locating member provided in the moveable portion is engaged to any one of a plurality of the locating portions provided in the case, by means of projections and recesses so that the position of the moveable portion can be determined. Since the moveable portion is stopped to align to the locating portion of the case, any one of a plurality of discs and the moveable portion can be accurately located. Further, looseness of the moveable portion due to external vibrations is prevented.

Since the first moveable chassis is located by the locating mechanism, the disc is ejected and then the second moveable chassis is moved to clamp the disc between the two moveable chassis, the need for a special drive mechanism for clamping the disc for the movable portion is eliminated. The disc can is clamped simply by moving the second moveable chassis, simplifying the structure. Further, the moveable chassis can be made to accurately face the selected disc because the first moveable chassis is accurately located. Therefore, the looseness of the moveable chassis due to external vibrations is prevented.

Although the invention has been described in its preferred form it is understood that the present disclosure of the preferred form may be changed in details of construction, and the combination and arrangement of parts may be resorted to, without departing from the spirit and the scope of the invention as hereinafter claimed.

What is claimed is:

1. A disc selectable player comprising:

a case including a disc installation portion for receiving a plurality of discs arranged in a vertical stack;

a moveable portion housed in the case, the moveable portion having a disc removal mechanism for removing a selected disc from the disc installation portion, said moveable portion also having a disc drive portion for rotating the selected disc removed by said disc removal mechanism;

a drive mechanism for moving said moveable portion in a vertical direction to position the moveable portion next to a selected one of the discs;

a plurality of vertically-arranged locating portions provided on said case, each of said locating portions being associated with one of the discs; and a locating member movably provided on said moveable portion;

wherein the locating member is horizontally moved to engage with one of said plurality of locating portions to accurately position the moveable portion when the selected disc is removed from said disc installation portion; and wherein the locating member is moved horizontally to disengage from all of said plurality of vertically-arranged locating portions before said moveable portion is vertically moved by said drive mechanism.

2. A disc selectable player according to claim 1, wherein said moveable portion is provided with a first moveable chassis having said disc removal mechanism and said locating member, a second moveable chassis to which force for vertically moving said moveable portion is supplied from said drive mechanism, and a clamping member for clamping, between said two moveable chassis, said disc removed by said disc removal mechanism when said first and second moveable chassis approach each other, wherein said locating member is integrally provided with a locking portion so that said two moveable chassis are locked by said locking portion when said two moveable chassis are vertically moved to position the moveable portion to remove the selected disc and said two moveable chassis are disengaged when said locating member is moved in a direction toward a position at which said locating member is engaged with said one of said plurality of locating portions.

3. A disc selectable player according to claim 1, wherein either of said locating portions of said case and said locating member of said moveable portion is a groove having a wide end, and the other one is a projection member which an received within said groove.

4. A disc selectable player according to claim 1, wherein said plurality of locating portions of said case are symmetrically provided for each of a front plate of said case and a rear plate opposing said front plate, said locating member of said moveable portion being symmetrically provided on an inside of said front plate of said case and an inside of said rear plate of said case, and said locating member is interlocked by a link mechanism provided for said moveable portion.

5. A disc selectable player according to claim 1, wherein a restriction member is disposed in a passage through which said disc is removed from said disc installation portion and said restriction member is, by moving force of said locating member, moved to a position at which a removal passage for discs left in said disc installation portion is blocked when a predetermined disc is removed by said disc removal mechanism, and said locating member is moved in a direction in which said locating member is engaged to said locating portion.

6. A disc selectable player according to claim 1, wherein said moveable portion is provided with a motor and a force conversion mechanism for operating said disc removal mechanism in a direction in which said disc is removed by a force of said motor and for moving said locating member in a direction in which said locating member is engaged to one of said locating portions.

7. A disc selectable player according to claim 6, wherein said moveable portion is provided with first and second moveable chassis facing each other and spaced apart at an interval and arranged to clamp said disc removed by said disc removal mechanism by interposing said disc therebetween, said first moveable chassis being provided with said disc removal mechanism, said locating member and said force conversion mechanism, and said second moveable chassis being provided with a spindle motor for driving said removed disc, said motor being disposed adjacent to said spindle motor.

8. A disc selectable player according to claim 7, wherein said first moveable chassis is provided with a first force transmission portion for transmitting the force of said motor to said force conversion mechanism, and said second moveable chassis is provided with a second force transmission portion connected to said motor and arranged to transmit the force of said motor, said first and second force transmission portions being engaged to each other in a spline manner to permit the interval between said first and second moveable chassis to be changed.

9. A disc selectable player according to claim 8, wherein said first and second force transmission portions are disposed on the outside of the outer circumference of said disc removed by said disc removal mechanism and within a square region defined by tangent lines of a circle corresponding to the outer circumference of said disc.

10. A disc selectable player according to claim 6, wherein said force conversion mechanism is provided with a rotor which is rotated by said force of said motor, and said disc removal mechanism and said locating member are connected to said rotor by respectively interposing cam mechanisms.

11. A disc selectable player according to claim 10, wherein the operation of said disc removal mechanism performed due to the rotation force of said rotor causes a predetermined disc to be completely removed, and then said rotor is further rotated to cause said locating member to be moved in a direction in which said locating member is engaged to said locating portion due to the rotational force of said rotor.

12. A disc selectable player according to claim 11, wherein said rotational force of said rotor realized after said predetermined disc has been removed is absorbed by said cam mechanism, whereby it is not transmitted to said disc removal mechanism.

13. A disc selectable player according to claim 1, wherein said locating member and said plurality of locating portions connect by means of projections and associated recesses.

14. A disc selectable player according to claim 2, wherein said drive mechanism drives said first and second moveable chassis, whereby their movement positions are continuously changed.

15. A disc selectable player according to claim 14, wherein said drive mechanism comprises:

an X-shape link mechanism including a central portion of a first link plate having an end fixed to said case and another end slidably supported by said second moveable chassis, and a second link plate having an end slidably supported by said case and another end secured to said second moveable chassis and connected by a connection pin; and a drive lever having an inclined hole into which said connection pin is slidably inserted and arranged to be slid by a force of a motor.

16. A disc selectable player according to claim 7, wherein said force conversion mechanism is provided with a rotor which is rotated by said force of said motor, and said disc removal mechanism and said locating member are connected to said rotor by respectively interposing cam mechanisms.

17. A disc selectable player according to claim 16, wherein the operation of said disc removal mechanism performed due to the rotational force of said rotor causes the selected disc to be completely removed, and then said rotor is further rotated to cause said locating member to be moved in a direction in which said locating member is connected to said locating portion due to the rotational force of said rotor.

18. A disc selectable player according to claim 17, wherein said rotational force of said rotor realized after the selected disc has been removed is absorbed by said cam mechanism, whereby it is not transmitted to said disc removal mechanism.

19. A disc selectable player according to claim 8, wherein said force conversion mechanism is provided with a rotor which is rotated by said force of said motor, and said disc removal mechanism and said locating member are connected to said rotor by respectively interposing cam mechanisms.

20. A disc selectable player according to claim 19, wherein the operation of said disc removal mechanism performed due to the rotational force of said rotor causes a predetermined disc to be completely removed, and then said rotor is further rotated to cause said locating member to be moved in a direction in which said locating member is connected to said locating portion due to the rotational force of said rotor.

21. A disc selectable player according to claim 20, wherein said rotational force of said rotor realized after the selected disc has been removed is absorbed by said cam mechanism, whereby it is not transmitted to said disc removal mechanism.

22. A disc selectable player comprising:

a case including a disc installation portion for receiving a plurality of discs arranged in a vertical stack;

a first moveable chassis movably disposed adjacent to the disc installation portion in the case, said first moveable chassis including a disc removal mechanism for removing a selected one of said discs from the disc installation portion;

a second moveable chassis facing said first moveable chassis, the second moveable chassis being spaced from the first moveable chassis at a distance which enables the selected disc removed by the disc removal mechanism to be held between the first moveable chassis and the second moveable chassis;

a disc drive portion mounted on a first one of said first and second moveable chassis;

a clamper mounted on a second one of said first and second moveable chassis;

a pickup mounted on either of said first and second moveable chassis;

a locating mechanism movably mounted on the first chassis, the locating mechanism being horizontally moved to engage with said case such that said first moveable chassis is in a first selected position to remove the selected disc from the disc installation portion, wherein said locating mechanism is horizontally moved to disengage from said first moveable chassis when said first moveable chassis is moved from said first selected position to a second selected position; and a drive mechanism for vertically moving said first and second moveable chassis to said first selected position, and for further moving said second moveable chassis in a direction toward said first moveable chassis after said first moveable chassis has been connected to the case in the first selected position and the selected disc has been removed from the disc installation portion, such that said selected disc is clamped by the clamper between said first and second moveable chassis.

23. A disc selectable player according to claim 22, wherein said first moveable chassis is provided with a force conversion mechanism for driving said disc removal mechanism and said locating mechanism by the force of a single motor.

24. A disc selectable player according to claim 23, wherein said force conversion mechanism includes a rotor which is rotated by a force of said motor, and said disc removal mechanism and said locating mechanism are connected to said rotor by respectively interposing cam mechanisms.

25. A disc selectable player according to claim 24, wherein said rotor is further rotated after the selected disc has been completely removed by the operation of said disc removal mechanism performed due to the rotational force of said rotor, wherein said locating mechanism is operated by said rotational force.

26. A disc selectable player according to claim 22, wherein said drive mechanism converts a force of a motor into force for moving said second moveable chassis, and a locking mechanism is provided for mutually locking said first and second moveable chassis when said first moveable chassis is moved to said first position and for cancelling locking when said first moveable chassis is disconnected from said disc removal mechanism.

27. A disc selectable player according to claim 22, wherein said drive mechanism drives said first and second moveable chassis, whereby their movement positions are continuously changed.

28. A disc selectable player according to claim 27, wherein said drive mechanism comprises:

an X-shape link mechanism including a central portion of a first link plate having an end fixed to said case and another end slidably supported by said second moveable chassis, and a second link plate having an end slidably supported by said case and another end secured to said second moveable chassis and connected by a connection pin; and a drive lever having an inclined hole into which said connection pin is slidably inserted and arranged to be slid by the force of said motor.

29. A disc selectable player comprising:

a case including a disc installation portion for receiving a plurality of discs arranged in a vertical stack;

a first moveable chassis movably disposed adjacent to the disc installation portion in the case, said first moveable chassis including a disc removal mechanism for removing a selected one of said discs from the disc installation portion;

a second moveable chassis facing said first moveable chassis, the second moveable chassis being spaced from the first moveable chassis at a distance which enables the selected disc removed by the disc removal mechanism to be held between the first moveable chassis and the second moveable chassis;

a disc drive portion mounted on a first one of said first and second moveable chassis;

a clamper mounted on a second one of said first and second moveable chassis;

a pickup provided mounted on either of said first and second moveable chassis;

a plurality of vertically-arranged locating portions provided in said case, each locating portion corresponding to a respective one of said plurality of discs;

a locating member provided on said first moveable chassis, the locating member being horizontally moved to engage with one of said locating portions when said first moveable chassis has been moved to a first position associated with said selected disc, wherein said locating member horizontally moves to disconnect from all of said locating portions when said first moveable chassis is moved from said first position to a second position; and a drive mechanism for vertically moving said first and second moveable chassis to said first position, and for further moving said second moveable chassis in a direction toward said first moveable chassis after said first moveable chassis has been connected with the case in the first selected position and the selected disc has been removed from the disc installation portion, such that said selected disc is clamped by the clamper between said first and second moveable chassis.

30. A disc selectable player according to claim 29, wherein said locating member and said locating portions engage by means of projections and associated recesses.

31. A disc selectable player according to claim 29, wherein said drive mechanism converts a force of a motor into force for moving said second moveable chassis, and a locking mechanism is provided for mutually locking said first and second moveable chassis when said first moveable chassis is moved to said first position and for cancelling locking when said first moveable chassis is moved from said first position to said second position.

32. A disc selectable player according to claim 29, wherein said drive mechanism drives said first and second movable chassis, whereby their movement positions are continuously changed.

33. A disc selectable player according to claim 32, wherein said drive mechanism comprises:

an X-shape link mechanism including a central portion of a first link plate having an end fixed to said case and another end slidably supported by said second moveable chassis, and a second link plate having an end slidably supported by said case and another end secured to said second moveable chassis and connected by a connection pin; and a drive lever having an inclined hole into which said connection pin is slidably inserted and arranged to be slide by a force of a motor.

* * * * *